United States Patent [19]
Kurita

[11] Patent Number: 5,805,413
[45] Date of Patent: Sep. 8, 1998

[54] SOLID ELECTROLYTIC CAPACITOR

[75] Inventor: Yoshio Kurita, Kyoto, Japan

[73] Assignee: Rohm Co., Ltd., Kyoto, Japan

[21] Appl. No.: 853,666

[22] Filed: May 9, 1997

[30] Foreign Application Priority Data

Sep. 13, 1996 [JP] Japan .................................. 8-243154

[51] Int. Cl.⁶ .................................................. H01G 2/16
[52] U.S. Cl. .................... 361/534; 361/272; 361/275.1; 361/275.4; 361/538; 361/539; 361/540; 361/301.3; 361/306.1; 361/307; 361/310
[58] Field of Search ................................... 361/272, 273, 361/274.1, 275.1, 275.2, 275.4, 534, 538–540, 301.3, 306.1, 307–310; 29/25.03

[56] References Cited

U.S. PATENT DOCUMENTS

| | | | |
|---|---|---|---|
| 4,989,119 | 1/1991 | Gouvernelle | 361/534 |
| 5,053,927 | 10/1991 | Baker et al. | 361/534 |
| 5,608,602 | 3/1997 | Kuriyama | 361/534 |

*Primary Examiner*—Bot L. Ledynh
*Attorney, Agent, or Firm*—Keiichi Nishimura

[57] ABSTRACT

A solid electrolytic capacitor has a molded casing containing therein a capacitor element, a first lead member connected to its anode and a second lead member connected to its cathode through a fuse. The second lead member is designed such that a relatively large capacitor element can be contained inside the casing although it must also have a large enough hole to allow a portion of the casing to penetrate therethrough to fasten it to the casing.

12 Claims, 2 Drawing Sheets

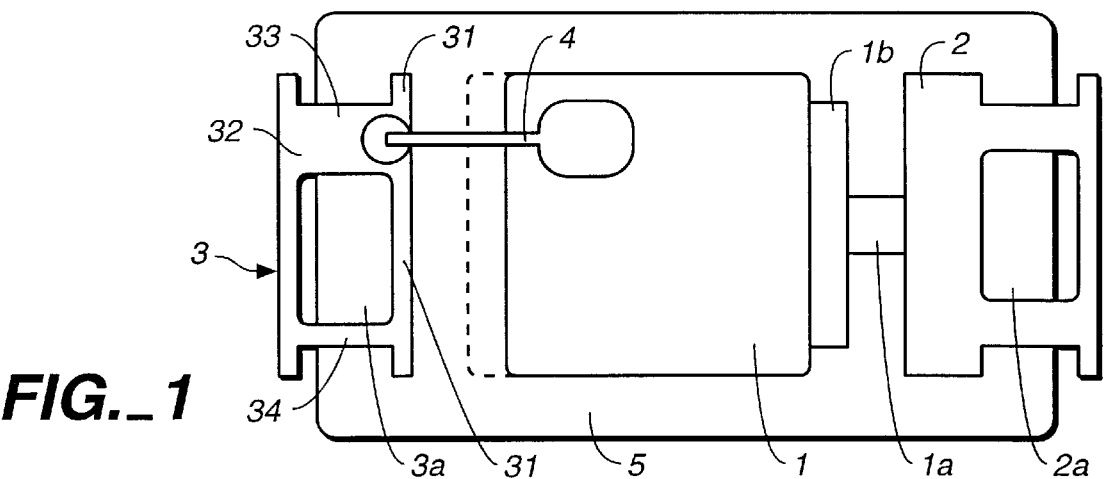
FIG._1
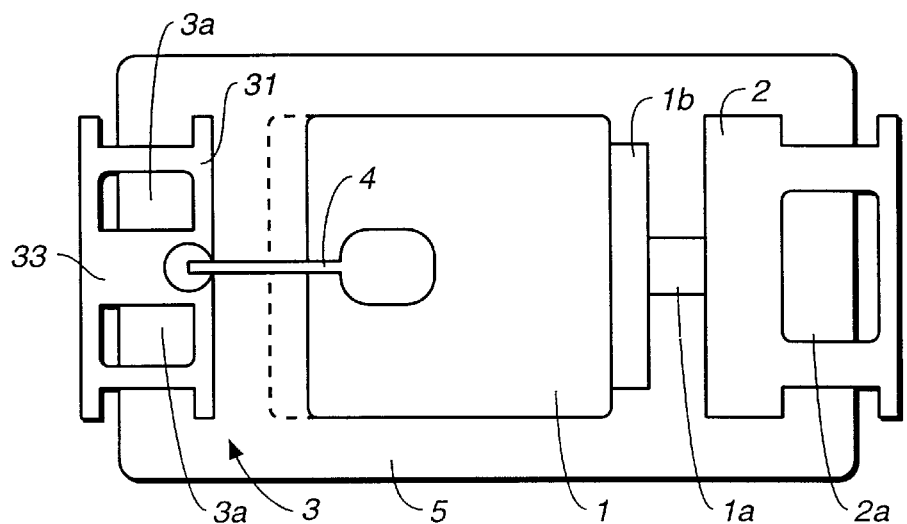
FIG._2
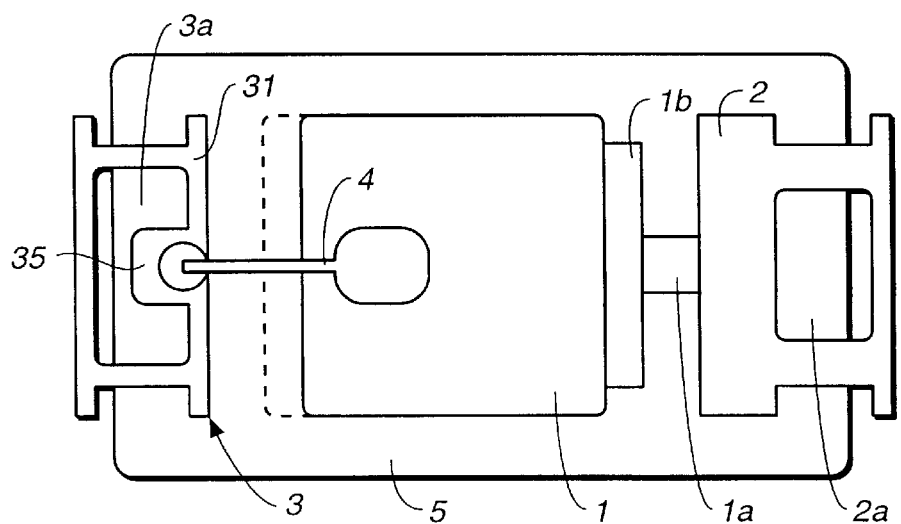
FIG._3

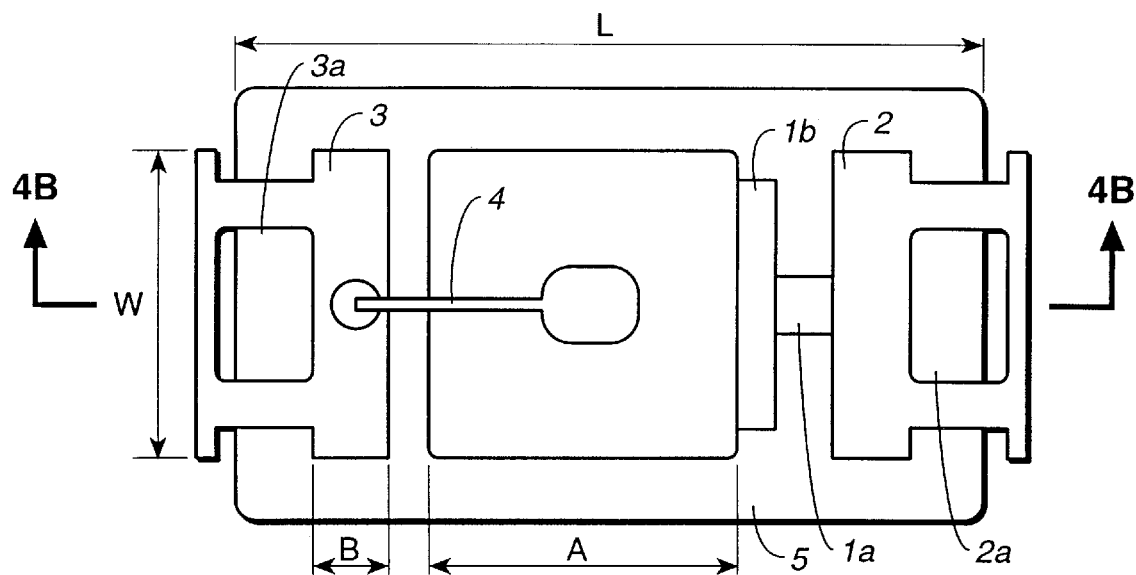
FIG._4A
(PRIOR ART)
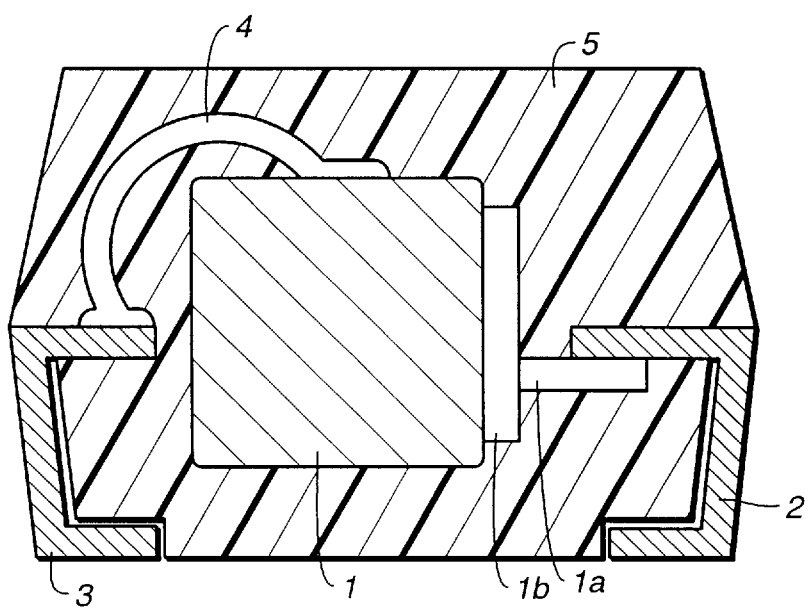
FIG._4B
(PRIOR ART)

5,805,413

SOLID ELECTROLYTIC CAPACITOR

BACKGROUND OF THE INVENTION

This invention relates to solid electrolytic capacitors such as tantalum capacitors and, more particularly, to solid electrolytic capacitors with a capacitor element and lead members effectively connected such that a relatively larger capacitor element can be sealed inside a casing of the same size.

It has been known to provide electronic components such as solid electrolytic capacitors having a temperature fuse connected in series such that parts of the circuit in which the component is incorporated would be protected when, for example, there is a short circuit in the component. FIGS. 4A and 4B show a prior art tantalum capacitor incorporating a fuse for such a purpose, having a capacitor element 1 with an anode lead 1a welded to be electrically connected to a first lead 2 of a lead frame and the cathode on the outer periphery of the capacitor element 1 connected through a fuse 4 (such as a temperature fuse) to a center position on the front part of a second lead 3. In order to protect this capacitor element 1, as well as other components which are connected to the first and second leads 2 and 3, a molded synthetic resin material is provided to cover them, forming a molded casing 5. The leads 2 and 3 are each cut from a lead frame and formed as shown in FIG. 4B with a throughhole 2a or 3a therethrough such that the resin material of the casing 5 can penetrate these throughholes 2a and 3a to thereby prevent the leads 2 and 3 from slipping off from the casing 5. In FIGS. 4A and 4B, numeral 1b indicates a blocking member for preventing any electrolytic liquid from approaching during a chemical conversion treatment step in the production of the capacitor element 1.

The fuse 4 is formed, for example, by first wire-bonding one end of a solder wire at a front end part of the second lead 3 of the lead frame and then connecting the other end to the cathode of the capacitor element 1 by thermocompression bonding. This means that the front end part of the second lead 3 is required to have an area sufficiently large for the wire-bonding. Thus, the width (indicated by letter B in FIG. 4A) between the throughhole 3a and the front edge of the second lead 3 is required to be about 0.3–0.5 mm. In the case of a compact solid electrolytic capacitor with total length L of the casing about 3 mm and its width W about 1.6 mm, the aforementioned width B of the front part of the second lead 3 is a serious problem.

As the volume of the capacitor element is increased (with respect to the overall size of the capacitor), the solid electrolytic capacitor increases its capacitance and voltage resistance, improving its characteristics. With the recent trend to miniaturize electronic devices, however, electronic components are also required to be made smaller. In other words, small components with improved characteristics are in demand. If the size of the casing is to remain the same, the capacitor element must be made larger. This being so, the requirement to maintain a large area at the front end of the second lead 3 for wire bonding is a severe one because this prevents the length A of the capacitor element 1 from becoming larger.

SUMMARY OF THE INVENTION

It is therefore an object of this invention to provide a solid electrolytic capacitor with improved characteristics although being smaller or at least of the same size as the prior art capacitors.

It is another object of this invention to provide such a solid electrolytic capacitor with a space for wire bonding of its fuse efficiently formed such that the distance between the front edge and the throughhole of the lead can be reduced and that size of the capacitor element can be accordingly increased.

A solid electrolytic capacitor embodying this invention, with which the above and other objects can be accomplished, may be characterized not only as comprising a capacitor element, a first lead member connected to its anode, a second lead member connected to its cathode through a fuse and a molded casing containing all these elements, but also wherein the second lead member is designed such that a relatively large capacitor element can be contained inside the casing although it must also have a large enough hole therethrough to allow a portion of the casing to penetrate therethrough to fasten it to the casing. For this purpose, the second lead member may be formed with a first transverse part and a second transverse part both extending transversely to the fuse, the first transverse member being disposed closer to the capacitor element than the second transverse member and at least two connecting parts connecting the first and second transverse parts and thereby completely surrounding at least one hole of a required size, one of the connector parts being sufficiently wide such that the fuse can be wire-bonded thereon instead of the first transverse member. With the second lead member thus designed, its first transverse part can be made thinner and a correspondingly larger capacitor element can be contained inside the casing to improve the overall characteristics of the capacitor.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a plan view of a solid electrolytic capacitor embodying this invention with the top of its casing removed;

FIG. 2 is a plan view of another solid electrolytic capacitor embodying this invention with the top of its casing removed;

FIG. 3 is a plan view of still another solid electrolytic capacitor embodying this invention with the top of its casing removed; and FIG. 4A is a plan view of a prior art tantalum capacitor with an upper portion of its molded casing removed to show its interior and FIG. 4B is its sectional side view taken along line 4B—4B of FIG. 4A.

Throughout herein, like components are indicated by the same numerals even if they are components of different capacitors and may not be repetitiously explained what they are.

DETAILED DESCRIPTION OF THE INVENTION

FIG. 1 shows a solid electrolytic capacitor according to a first embodiment of this invention, structured similarly to the prior art capacitor described above with reference to FIGS. 4A and 4B, having an anode lead 1a of its capacitor element 1 welded to a front end of a first lead 2 of a lead frame, the cathode of the capacitor element 1 connected to a second lead 3 through a fuse 4, a casing 5 of a molded resin material covering them, and the first and second leads 2 and 3 each provided with a throughhole 2a or 3a used for the purpose of preventing the corresponding lead 2 or 3 from disengaging from the resin casing 5. The capacitor according to the first embodiment of this invention shown in FIG. 1 is different from the prior art capacitor shown and explained above with reference to FIGS. 4A and 4B in that the fuse 4 is not attached by wire bonding to the second lead 3 at a center position on its front part but at one side of its throughhole 3a. Described more in detail, the second lead 3 has, surrounding its throughhole 3a, a first part 31 and a second part 32 which are both transverse to the direction in which the fuse 4 is extended, and a broader connector part 33 and a thinner connector part 34 which both extend parallel to the fuse 4 and connect the first part 31 with the second part 32, the broader connector part 33 having a greater width than the thinner connector part 34, and it is on the broader connector part 33 that the fuse 4 is connected by wire bonding. A major merit of this design is that the width of the first part 31 of the second lead 3 can be made thinner than the corresponding part shown in FIG. 4A with width indicated by letter B. and this means, as explained above, either that a larger capacitor element indicated by dotted line in FIG. 1 can be accommodated or that a smaller capacitor with a capacitor element of the same size can be provided according to this invention.

According to the example shown in FIG. 1, the throughhole 3a is formed eccentrically with respect to the second lead 3 in order to conveniently provide the broader connector 33 intentionally made broader for the wire-bonding of the fuse 4. Accordingly, the position at which the fuse 4 is bonded to the capacitor element 1 is also removed from the axial central line of the capacitor element 1. This, however, is not intended to limit the scope of the invention. The fuse 4 may be connected to the capacitor element 1 at a point on its axial central line or on the opposite side of the central line such that the fuse 4 will obliquely cross the central line. In summary, the basic idea behind this embodiment of the invention is to displace the position of the throughhole 3a such that one of the connector parts between the first and second parts 31 and 32 of the second lead 3 can be made sufficiently broad for the wire-bonding purpose.

It is to be noted that the throughhole 3a is provided such that when the casing 5 is formed by a molding process, a portion of the resin material will pass through it and the second lead 3 will be thereby prevented from being easily pulled out of the casing 5. For this purpose, a square throughhole with sides about 0.3–0.5 mm would be sufficient. Even a smaller throughhole may be acceptable, such as a hole with width (in the direction perpendicular to the extension of the fuse 4) of about 0.1 mm, the portion of the area of the hole overlapping with the body of the casing 5 being equally about 0.1 mm. Thus, a sufficiently broad connector between the first and second parts 31 and 32 of the second lead 3 can be provided also by reducing the size of the throughhole 3a.

As for the width of the broader connector 33 on which one end of the fuse 4 is to be wire-bonded, its width must necessarily be larger than the diameter of the ball formed when the fuse 4 is bonded thereon. The diameter of such a ball is 0.15–0.25 mm if the sectional diameter of the fuse 4 is about 0.08 mm. It is 0.2–0.35 mm if the sectional diameter of the fuse 4 is increased to 0.1 mm. In other words, the portion of the second lead 2 of the prior art capacitor shown in FIG. 4A, corresponding to the first part 31 of the capacitor of FIG. 1, was conventionally required to be broad enough to support thereon a ball of this dimension. According to the present invention, the first part 31 of the second lead 2 may be made thinner, and the overall dimension of the capacitor can be reduced or the dimension of the encapsulated capacitor element therein can be increased to the extent to which the width of the first part 31 is thus reduced.

In view of the above, the second lead 3 may be designed as shown in FIG. 2 with two smaller throughholes 3a separated by one broader connector part 33, thinner connector parts 34 being provided on both sides of the broader connector part 33, connecting the first and second parts 31 and 32. According to this embodiment of the invention, too, the first part 31 can be made thinner than required according to the prior art design shown in FIG. 4A, and a relatively larger capacitor element 1 can be accommodated.

FIG. 3 shows still another embodiment of the invention wherein a portion of the first part 31 of the second lead 3 is formed with a protrusion 35 protruding towards the second part 32 without reaching it and being sufficiently broad such that the fuse 4 can be wire-bonded thereon. Although the protrusion 35 reduces the separation between the first and second parts 31 and 32 where it is formed, the throughhole 3a, as a whole, is large enough in area such that the resin material of the casing 5 can penetrate this area to securely hold the second lead 3 in position. According to this embodiment, too, the first part 31 of the second lead 3 where the protrusion 35 is not formed can be made thinner than the corresponding part shown in FIG. 4A such that a relatively larger capacitor element 1 can be accommodated.

Although the invention has been described above with reference to only a limited number of embodiments, these examples are not intended to limit the scope of the invention. Many modifications and variations are possible within the scope of the invention. In summary, this invention teaches how to efficiently make use of the space where the capacitor element and a lead are connected such that a relatively larger capacitor element can be contained inside the casing and hence that the characteristics of the capacitor as a whole can be improved and/or the overall side of the capacitor can be reduced.

What is claimed is:

1. A solid electrolytic capacitor comprising:

a capacitor element having a first electrode and a second electrode;

a first lead member electrically connected to said first electrode;

a second lead member;

a longitudinally extended fuse which electrically connects said second electrode with said second lead member; and a molded casing containing therein said capacitor element and portions of said first and second lead members connected to said capacitor element;

said second lead member comprising:

a first transverse part and a second transverse part both extending transversely to said fuse, said first transverse member being disposed closer to said capacitor element than said second transverse member and at least two connector parts connecting said first and second transverse parts and thereby completely surrounding at least one hole through said second lead member, said fuse being bonded to one of said connector parts.

2. The solid electrolytic capacitor of claim 1 wherein one of said connector parts is significantly broader than the others of said connector parts, said fuse being bonded to said broader connector part.

3. The solid electrolytic capacitor of claim 2 wherein said broader connector parts is sandwiched between two of thinner connector parts, providing said second lead member with two mutually separated holes.

4. The solid electrolytic capacitor of claim 1 wherein a portion of said molded casing penetrates said hole to serve to secure said second lead member.

5. The solid electrolytic capacitor of claim 2 wherein a portion of said molded casing penetrates said hole to serve to secure said second lead member.

6. The solid electrolytic capacitor of claim 3 wherein a portion of said molded casing penetrates said hole to serve to secure said second lead member.

7. The solid electrolytic capacitor of claim 2 wherein said fuse has a sectional diameter greater than 0.08 mm and said broader connecting part has width greater than 0.25 mm.

8. The solid electrolytic capacitor of claim 3 wherein said fuse has a sectional diameter greater than 0.08 mm and said broader connecting part has width greater than 0.25 mm.

9. A solid electrolytic capacitor comprising:

a capacitor element having a first electrode and a second electrode;

a first lead member electrically connected to said first electrode;

a second lead member;

a longitudinally extended fuse which electrically connects said second electrode with said second lead member; and a molded casing containing therein said capacitor element and portions of said first and second lead members connected to said capacitor element;

said second lead member comprising:

a first transverse part and a second transverse part both extending transversely to said fuse, said first transverse member being disposed closer to said capacitor element than said second transverse member and at least two connecting parts connecting said first and second transverse parts and thereby completely surrounding at least one hole through said second lead member, said first transverse part having a protrusion which protrudes towards but does not reach said second transverse part, said fuse being bonded to said protrusion.

10. The solid electrolytic capacitor of claim 9 wherein a portion of said molded casing penetrates said hole to serve to secure said second lead member.

11. The solid electrolytic capacitor of claim 9 wherein said protrusion is broad enough to have one end of said fuse wire-bonded thereon.

12. The solid electrolytic capacitor of claim 9 wherein said fuse has a sectional diameter greater than 0.08 mm and said protrusion has width greater than 0.25 mm.

* * * * *